United States Patent

Valenty

[11] Patent Number: 5,234,983
[45] Date of Patent: Aug. 10, 1993

[54] SUBLIMATION-TRANSFER RECEPTOR-SURFACE COATING FOR CERAMIC ARTICLES

[76] Inventor: Vivian B. Valenty, 7918 S. Kenwood La., Tempe, Ariz. 85284

[21] Appl. No.: 933,745

[22] Filed: Aug. 24, 1992

[51] Int. Cl.$^5$ ............................................. C08G 18/58
[52] U.S. Cl. ...................................... 524/283; 528/45;
252/182.2; 523/456; 523/461; 427/386;
525/452; 525/453; 525/124; 525/460
[58] Field of Search ........................ 528/45; 252/182.2;
523/456, 461; 525/452, 453, 124, 460; 427/386;
524/283

[56] References Cited

U.S. PATENT DOCUMENTS

| | | | |
|---|---|---|---|
| 4,701,502 | 10/1987 | Kordomenos et al. | 525/449 |
| 4,824,925 | 4/1989 | Kamarchik, Jr. et al. | 528/45 |
| 4,923,934 | 5/1990 | Werner | 525/528 |
| 4,943,684 | 7/1990 | Kramer | 428/34.4 |

Primary Examiner—Maurice J. Welsh
Attorney, Agent, or Firm—Antonio R. Durando; Harry M. Weiss

[57] ABSTRACT

A coating composition for a substrate to be imprinted with an image by means of sublimation or heat transfer that comprises a mixture of an epoxy resin and a blocked polyisocyanate in an equivalent-weight ratio in a range from 0.5 to 1.8 in appropriate solvents When cured, this composition results in a low glass-transition-temperature polyurethane that is smooth, colorless, tough, clear and glossy, capable of accepting a perfect reproduction of the transfer print. Upon exposure to hot water during dishwashing, the unreacted polymer-bound isocyanate groups further react to form a skin of highly crosslinked polymer chains. The skin creates a barrier to the deleterious effects of water on adhesion and to the diffusion of sublimation dyes out of the coating. The resulting transferred image is colorfast and the coating has strong adhesion to ceramic surfaces to survive repeated mechanical dishwashing.

26 Claims, No Drawings

SUBLIMATION-TRANSFER RECEPTOR-SURFACE COATING FOR CERAMIC ARTICLES

BACKGROUND OF THE INVENTION

1. Field of the Invention

This invention pertains to the general field of sublimation or heat transfer printing, whereby an image is transferred to a receptor surface from a sublimable transfer print. In particular, the invention concerns a new polyurethane composition and method for coating ceramics and other surfaces to improve the quality and durability of the transferred image.

2. Background of the Invention

Sublimation or thermal transfer printing is a relatively new technology that has found its way into consumer product application during the past decade. In particular, the market for personalized decoration of clothing such as T-shirts and coffee mugs has grown explosively during the past five years.

Basically, the process of imprinting an article via this process consists of converting a picture into a digital image and transferring it onto a diffusable or sublimable transfer print. The dyes used for the transfer print are capable of diffusing or sublimating from the transfer print into another receptive surface when the two surfaces are brought into intimate contact, normally under pressure, and heated at specific operating conditions. Typically, heating is carried out at 375 to 500 degrees Fahrenheit (190°–260° C.) for 60 seconds to 3 minutes, the specific length of time depending on factors such as how fast the heater is able to bring the receiving surface to the temperature at which the dyes diffuse or sublimate and the temperature at which the transfer print is able to release the dyes. With currently used dyes, this temperature is about 375° F. (190 ° C.).

The patent literature contains much information pertaining to the composition of the transfer print used for transferring the image onto a receiving substrate. Most of the literature pertaining to the substrate itself, on the other hand, does not deal with mugs or similar hard-surface articles; rather it understandably describes textiles such as cotton, polyester and wool because the popularity of imprinting these materials supersedes that of articles like coffee mugs.

U.S. Pat. Nos. 4,701,502, 4,824,925 and No. 4,923,934 disclose various coating compositions of general application. U.S. Pat. No. 4,943,684 describes a process for imprinting cylindrical ceramic and glass articles, specifically coffee mugs, via sublimation or heat (thermal) transfer printing. The patent also discloses epoxy and polyester polymers as the suitable coatings for the invention.

Commercially available mugs for personalized imprinting via sublimation or thermal transfer printing have a polymeric coating applied to the outer surface. The coating is intended to provide a stable layer for fixing the image to the surface of the mug and protecting it from erosion and abrasion during use. All of these coatings belong to the generic classes of polymers comprising epoxies, acrylics, polyesters and polyurethane. Polyurethanes provide the best image quality, but suffer in adhesion and are easily removed by repeated dishwasher cycles. The only types of coating that survive repeated washings in a mechanical dishwasher are based on epoxy material, which has a high glass transition temperature and therefore is not suitable for optimum image transfer. Thus, there is a need for a coating composition that combines the positive attributes of both types of polymers.

In my effort to combine the image-transfer quality of polyurethanes with the strong adhesion properties of epoxies, I discovered that the ideal polymer coating should exhibit two distinct glass transition temperatures before and after the image transfer process. The glass transition temperature, also called the softening temperature of a polymer, refers to the temperature at which the polymer changes from a glassy or brittle condition to a liquid or rubbery one. For an amorphous polymer, this is a narrow temperature region in which the polymer changes from a viscous or rubbery condition at temperatures above this region to a hard and relatively brittle one below it. This transformation is equivalent to the solidification of a liquid to a glass; it is not a phase transition. Above the glass transition temperature, portions of the polymer chains, usually called segments, are comparatively unhampered by the interactions between neighboring chains. See Paul J. Flory, *Principles of Polymer Chemistry*, pages 57–57, Cornell University Press, 1953.

The glass transition temperature of the ideal polymer coating for image imprinting by heat transfer should be as low as possible before the transfer printing operation in order to allow the dyes to diffuse easily into the polymer matrix as they are given off by the transfer printing medium. After the image transfer, in order to preserve the quality of the transferred image during repeated dishwashing cycles, the coating on the receptor surface should have as high a glass transition temperature as possible to minimize dye diffusion in the coating during hot-water dishwashing that would cause image distortion and bleeding.

One approach is to have a coating that is cured in two steps. The initial cure is performed below 375° F. (190° C.) to provide a coating with a low glass transition temperature. The final cure takes place during the imprinting step where the mug is brought to 375° F. or higher temperatures. This final heating raises the glass transition temperature of the coating, sealing the dyes in the polymer matrix and providing durability of the coating and colorfastness to the image during repeated dishwashing. This appears to be the approach adopted by some suppliers of coated mugs for sublimation-transfer imprinting. The glass transition temperature of the epoxy coating on the mugs before the imprinting step is about 200° F. (93° C.). After imprinting, the glass transition temperature is raised to about 255° F. (124° C.).

This particular approach has one drawback. Since the glass transition temperature increases with the degree of curing, which in turn is related to exposure to high temperatures, the initial curing must be limited to a narrow process window in order to keep the glass transition temperature low enough to achieve optimum image transfer during the sublimation process. Also, the rate of reaction and curing of the coating prior to the image transfer operation is only retarded, not completely inhibited. Therefore, during the summer months, when the southern part of the United States experiences outdoor temperatures of 110°–120° F. (43°–49° C.) and the temperature in unrefrigerated cargo compartments (such as used to transport nonperishable goods like coated mugs) approaches 160° F. (71° C.), the thermal reaction and curing of the polymer is accelerated during storage and transportation of coated articles, resulting in poor quality of the subsequent image transfer. Thus, these articles require refrigeration and special handling, which add considerable cost to the final product.

The object of the present invention is a novel approach based on providing a coating that possesses a low initial glass transition temperature for accepting an image by thermal transfer and that, after the image-transfer process, features a protective seal over the transferred dyes in the polymer matrix by forming a highly crosslinked and therefore impervious outer layer.

SUMMARY OF THE INVENTION

An object of the present invention is to provide a receptor coating for sublimation and thermal transfer of images onto ceramic, glass, metal and other substrates wherein such coating is capable of permanently fixing the image without distortion or loss of sharpness.

Another object of the invention is to provide durable coating that is capable of resisting separation from the substrate during repeated hot-water dishwasher cycles.

A further object is to provide a coating with a sufficiently high post-transfer glass transition temperature to inhibit any fading or distorting of the transferred image by exposure to hot water.

Another goal of the invention is a coating that has strong adhesion to ceramic surfaces to survive the repeated mechanical forces applied to the article during normal use.

Finally, a goal of the invention is to provide a composition of low toxicity that is suitable for use in kitchenware.

According to these objectives, the present invention consists of a coating composition comprising a mixture of an epoxy resin and a blocked polyisocyanate in an equivalent-weight ratio in the range from 0.5 to 1.8 in appropriate solvents. When cured, this composition results in a low glass-transition-temperature polyurethane that is smooth, colorless, tough, clear and glossy, capable of accepting a perfect reproduction of the transfer print. Upon exposure to hot water during dishwashing, the unreacted polymer-bound isocyanate groups further react to form a skin of highly crosslinked polymer chains. The skin creates a barrier to the deleterious effects of water on adhesion and to the diffusion of sublimation dyes out of the coating. The resulting transferred image is colorfast and the coating has strong adhesion to ceramic surfaces to survive repeated mechanical dishwashing.

These and other objects, features and advantages of the present invention, as well as details of the preferred embodiment thereof, will be more fully understood from the following detailed description.

DETAILED DESCRIPTION OF THE PREFERRED EMBODIMENT

The sublimation-transfer receptor-surface of this invention is based on a polyurethane system composed of a polyol and a polyisocyanate to give, on initial curing, a polymer product possessing a glass transition temperature below 90° F. (32° C.). As is well known to those skilled in the art, in order to obtain a polyurethane with optimum properties, a polyol and a polyisocyanate must be combined in such proportions with each other that the number of reactive functionalities in the polyol is equal to the number of reactive functionalities in the polyisocyanate. In the course of evaluating various polyurethane formulations that might result in the desired glass transition temperature after an initial curing phase, I was pleasantly surprised to find that when a blocked polyisocyanate was combined with an epoxy prepolymer at proportions that give equivalent reactive groups the initial reaction always produced a polymer matrix with a low glass transition temperature and possessing a slight excess of unreacted isocyanate groups.

During a dishwashing cycle or short treatment with boiling water after transfer of the image, these isocyanate groups reacted with the water to produce a highly crosslinked skin, with the groups located at the outer surface of the coating reacting quickly. None of the isocyanate groups were extractable into the water phase, but instead remained bound to the coating. As a result of this reaction, the polymer coating exhibited a much higher glass transition temperature after its initial exposure to hot water and was totally devoid of unreacted isocyanate groups after approximately 30 minutes in boiling water. The transferred image was colorfast, as judged by the absence of dye bleed from the coating when the quality of the image was compared to a mug that did not receive the boiling water treatment.

According to this invention, the preferred epoxy component of the polyurethane solution is present in a range from 4 to 30 percent by weight (optimally from 10 to 25%) and has a formula corresponding to:

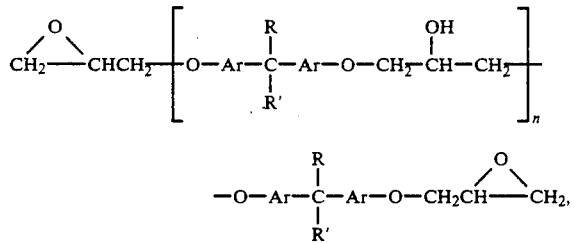

where Ar is an aryl group; $n=2$ to 18, preferably 8 to 14; and R and R' consist of a hydrocarbyl radical with 1-6 carbon atoms, or mixtures thereof.

The polyisocyanate component is present in the range from 3 to 36 percent by weight (optimally 6–30%), wherein the isocyanate groups are blocked with methyl ethyl ketoxime or caprolactam or any other oxime or blocking group capable of being deblocked upon heating at about 260° to about 430° F. (121°–221° C.). The isocyanate groups comprise at least two functional groups and may have an aliphatic or cycloaliphatic backbone. The corresponding isocyanate prepolymers (biurets and isocyanurates) are preferred for reasons of lower health hazard during the manufacturing process because of their lower volatility. Moreover, blocked polyisocyanates are best preferred because of their stability at normal ambient conditions, which make it possible to prepare polyurethane formulations as one-part products, rather than two-part components for mixing at the time of use.

The epoxy and isocyanate components must be combined in an epoxy/isocyanate ratio in a range of 0.5 to 1.8 (based on equivalent weights), with the preferred ratio being in the range from 0.6 to 1.2. The ratio may be optimized for the specific epoxy used, together with the appropriate solvent, in order to obtain the desired consistency of composition. Depending on the intended method of application, such as by spraying or immersion in a coating bath, the texture and viscosity of the composition can be modified to conform to required specifications.

The epoxy component may be diluted with a polyester, polyether, polyacrylic polyol, or a mixture thereof. The maximum amount of polyol diluent depends upon the rigidity of the backbone of the polyol. An excess of a rigid polyol leads to a polyurethane with a higher glass transition temperature than is optimal for vivid transferred images. Excessive dilution with a flexible polyol leads to too soft a coating that allows the undesirable diffusion of the transferred dyes from within the polymer matrix during dishwashing. In any event, the total number of reactive hydroxy groups in the diluted mixture must remain the same as that of the pure epoxy component to maintain equivalency with the isocyanate groups.

In addition, 10 to 20 percent equivalents of melamine resin or of any of the other well known epoxy crosslinkers may be added. The maximum amount of these resin diluents is dependent upon their glass transition temperatures and solubilities in epoxy. For example, a maximum of 10% substitution may be made with the polyacrylic resin sold by the DuPont Company under the trademark "Imron 500S" in conjunction with the epoxy resin consisting of polydiglycidyl ether of Bisphenol A (n=8-14), which is sold by the Shell Chemical Company under the trademark "Epon 1007F." Using the same epoxy resin, as much as 20% substitution may be made with the polyarylate resin sold by the Miles Company under the trade name "Desmophen A365."

The solvent carrier for the coating formulation may be a mixture of glycolether esters and aromatic hydrocarbons. Preferred solvents are propylene glycol methyl ether acetate and ethyl 3-ethoxypropionate in combination with any of the aromatic hydrocarbons. They may be diluted with lower boiling esters such as n-butyl acetate, with aromatic hydrocarbon solvents such as toluene, xylene, solvent naphtha, or with ethyl benzene, n-butanol, isopropanol, or with water. The proportion of aromatic hydrocarbons to glycolether esters used in the formulation, as well as the total amount of solvent, depends upon the viscosity desired, which, as mentioned above, is influenced by the intended method of application and equipment used. Aliphatic hydrocarbons are not used because they are very poor solvents for the reactive components.

While the basic ingredients necessary to practice the invention are an epoxy prepolymer and a polyisocyanate component in an appropriate solvent carrier, other ingredients may also be added to impart specific desirable characteristics. For example, a catalyst may be added to facilitate the polyurethane formation during curing; a flow modifier to add consistency in the viscosity of composition; ultraviolet screens and absorbers to increase the colorfastness of the transferred image to sunlight; and an adhesion promoter to provide a polymer coating that is resistant to repeated mechanical dishwashing.

In order to facilitate the reaction of the polyisocyanate with the epoxy component, a catalyst may be added to the composition, although it is critical only for shortening the curing time. Any catalyst used in the art for urethane polymerization, such as ptoluenesulfonic acid or tris(dimethylaminomethyl) phenol, may be employed. Although tertiary amines and amine-blocked Lewis acids are effective as catalysts, the coatings from them have a tendency to yellow during prolonged heating, exposure to temperature during bake and after repeated dishwashings. For a colorless coating that resists yellowing in prolonged boiling water treatment and repeated dishwashing, the tin catalysts are preferred. Dibutyltin dilaurate is specially preferred over the other tin catalysts, such as stannous octoate, because of its higher effectiveness. The amount of catalyst used obviously depends on the specific catalyst's activity. For example, dibutyltin dilaurate can be used at 20 to 50 ppm, whereas a higher level of stannous octoate (0.1 to 1.0% by weight) is necessary to achieve a corresponding cure. If a catalyst is used, its amount is very important to obtain optimum coating properties.

A flow modifier may be added to the formulation to consistently produce a smooth coating when the coating is to be applied by spraying. Suitable flow modifiers are the fluoropolymer surfactant product sold by the 3M Company under the trademark "Fluorad FC.430" and the silanol-dimethyldiphenylsiloxane sold by the GE Company under the trademark "SR882M." The amount of flow modifier must be adjusted to meet the requirements of the specific application, avoiding using too much of it because it produces a coating that makes the release of the transfer paper difficult after the imprinting process. I found the above mentioned flow modifiers at 0.2 to 1.0 parts per hundred weight parts of polyurethane resin to be satisfactory.

Although the basic formulation of epoxy and isocyanate leads to a coating that has better light stability than a pure epoxy coating, ultraviolet screens such as hindered-amine light stabilizers, or ultraviolet absorbers such as hindered phenols, benzotriazoles and/or cyanoacrylate esters may be added to increase the colorfastness of the transferred image to direct sunlight. These additives may be used at the levels recommended by the manufacturers.

Finally, in order to provide strong adhesion that is resistant to repeated mechanical dishwashing or boiling water treatment, an adhesion promoter is added to the uncured polyurethane solution, preferably immediately prior to its use. If added earlier, I found that the effectiveness of adhesion promoters diminishes with time and becomes practically ineffectual after about one week of shelf life. Although the adhesion promoter may be applied directly to the mug surface as a primer prior to the coating process, its addition to the coating formulation is a time saver. Suitable adhesion promoters available commercially belong to the group of organosilane coupling agents such as the aminoalkyl trialkoxy silanes or, more specifically, aminopropyltrimethoxysilane, aminopropyltriethoxysilane, aminoethylaminopropyltrimethoxysilane and aminoethylaminopropyltriethoxysilane. These additives may be used at 0.2 to 2.0 parts per hundred weight parts of polyurethane resin, preferably at 0.5 to 1.0 part per hundred. An adhesion promoter is necessary for the coating to survive at least 100 mechanical dishwashing cycles if the ceramic mug is not pretreated, such as by the etching processes often used to prepare a substrate for coating.

The following examples list alternative formulations of the preferred embodiment of the coating according to this invention, including the adhesion-promoter component of the composition.

| Example 1 | |
|---|---|
| Ingredient | Weight Percent |
| epoxy resin | 18.33 |
| ethyl 3-ethoxy propionate | 43.75 |

Example 1

| Ingredient | Weight Percent |
|---|---|
| melamine resin | 3.23 |
| polyarylate polyol | 5.80 |
| methyl ethyl ketoxime-blocked polyisocyanate | 7.76 |
| fluoropolymer surfactant | 0.11 |
| n-butanol | 1.94 |
| n-butyl acetate | 7.96 |
| propylene glycol methyl ether acetate | 5.58 |
| solvent naphtha | 2.54 |
| xylene | 0.80 |
| p-toluenesulfonic acid | 0.65 |
| isopropanol | 0.43 |
| aminopropyltrimethoxysilane | 1.08 |

Example 2

| Ingredient | Weight Percent |
|---|---|
| epoxy resin | 13.94 |
| propylene glycol methyl ether acetate | 55.74 |
| methyl ethyl ketoxime-blocked polyisocyanate | 16.69 |
| solvent naphtha | 5.51 |
| n-butyl acetate | 6.13 |
| fluoropolymer surfacant | 0.15 |
| aminopropyltrimethoxy silane | 0.31 |
| stannous octoate | 0.15 |
| xylene | 1.38 |

Example 3

| Ingredient | Weight Percent |
|---|---|
| epoxy resin | 14.3 |
| propylene glycol methyl ether acetate | 51.63 |
| methyl ethyl ketoxime-blocked polyisocyanate | 18.80 |
| solvent naphtha | 6.28 |
| n-butyl acetate | 7.13 |
| fluoropolymer surfactant | 0.14 |
| p-toluenesulfonic acid | 0.09 |
| n-butanol | 1.28 |
| isopropanol | 0.06 |
| aminopropyl trimethoxy silane | 0.29 |

Example 4

| Ingredient | Weight Percent |
|---|---|
| epoxy resin | 15.54 |
| propylene glycol methyl ether acetate | 50.04 |
| methyl ethyl ketoxime-blocked polyisocyanate | 20.52 |
| solvent naphtha | 6.84 |
| n-butyl acetate | 6.22 |
| fluoropolymer surfactant | 0.16 |
| aminopropyl trimethoxy silane | 0.31 |
| xylene | 0.37 |
| dibutyltin dilaurate | 37 ppm |

Example 5

| Ingredient | Weight Percent |
|---|---|
| epoxy resin | 16.12 |
| propylene glycol methyl ether acetate | 47.98 |
| methyl ethyl ketoxime-blocked polyisocyanate | 21.29 |
| solvent naphtha | 7.11 |
| n-butyl acetate | 6.45 |
| fluoropolymer surfactant | 0.08 |
| n-butanol | 0.58 |
| tris (dimethylaminomethyl) phenol | 0.07 |
| aminopropyl trimethoxy silane | 0.32 |

Example 6

| Ingredient | Weight Percent |
|---|---|
| epoxy resin | 15.77 |
| propylene glycol methyl ether acetate | 49.37 |
| methyl ethyl ketoxime-blocked polyisocyanate | 20.82 |
| solvent naphtha | 6.94 |
| n-butyl acetate | 6.31 |
| silanol-dimethyldiphenylsiloxane | 0.16 |
| aminopropyl trimethoxy silane | 0.32 |
| xylene | 0.31 |
| dibutyltin dilaurate | 31 ppm |

Example 7

| Ingredient | Weight Percent |
|---|---|
| epoxy resin | 17.42 |
| propylene glycol methyl ether acetate | 40.91 |
| methyl ethyl ketoxime-blocked polyisocyanate | 23.00 |
| solvent naphtha | 7.67 |
| xylene | 10.79 |
| fluoropolymer surfactant | 0.04 |
| aminopropyl trimethoxy silane | 0.17 |
| dibutyltin dilaurate | 34 ppm |

Example 8

| Ingredient | Weight Percent |
|---|---|
| epoxy resin | 19.15 |
| propylene glycol methyl ether acetate | 45.31 |
| methyl ethyl ketoxime-blocked polyisocyanate | 17.62 |
| solvent naphtha | 5.94 |
| xylene | 11.72 |
| fluoropolymer surfactant | 0.08 |
| aminopropyl trimethoxy silane | 0.18 |
| dibutyltin dilaurate | 23 ppm |

Example 9

| Ingredient | Weight Percent |
|---|---|
| epoxy resin | 17.28 |
| propylene glycol methyl ether acetate | 34.94 |
| methyl ethyl ketoxime-blocked polyisocyanate | 22.82 |
| solvent naphtha | 7.61 |
| xylene | 14.11 |
| fluoropolymer surfactant | 0.10 |
| aminopropyl trimethoxy silane | 0.23 |
| benzotriazole | 1.94 |
| hindered amine | 0.97 |
| dibutyltin dilaurate | 28 ppm |

Example 10

| Ingredient | Weight Percent |
|---|---|
| epoxy resin | 17.63 |
| propylene glycol methyl ether acetate | 45.13 |
| caprolactam-blocked polyisocyanate | 22.50 |
| xylene | 14.39 |
| fluoropolymer surfactant | 0.11 |

-continued
Example 10

| Ingredient | Weight Percent |
| --- | --- |
| aminopropyl trimethoxy silane | 0.24 |
| dibutyltin dilaurate | 28 ppm |

Example 11

| Ingredient | Weight Percent |
| --- | --- |
| epoxy resin | 18.80 |
| propylene glycol methyl ether acetate | 46.30 |
| caprolactam-blocked polyisocyanate | 19.18 |
| xylene | 15.35 |
| fluoropolymer surfactant | 0.11 |
| aminopropyl trimethoxy silane | 0.26 |
| dibutyltin dilaurate | 30 ppm |

Example 12

| Ingredient | Weight Percent |
| --- | --- |
| epoxy resin | 17.15 |
| propylene glycol methyl ether acetate | 48.75 |
| caprolactam-blocked polyisocyanate | 20.20 |
| xylene | 13.52 |
| fluoropolymer surfactant | 0.12 |
| aminopropyl trimethoxy silane | 0.26 |
| dibutyltin dilaurate | 32 ppm |

Example 13

| Ingredient | Weight Percent |
| --- | --- |
| epoxy resin | 18.29 |
| propylene glycol methyl ether acetate | 43.80 |
| methyl ethyl ketoxime-blocked polyisocyanate | 27.87 |
| solvent naphtha | 9.29 |
| xylene | 0.34 |
| fluoropolymer surfactant | 0.13 |
| aminopropyl trimethoxy silane | 0.28 |
| dibutyltin dilaurate | 34 ppm |

Example 14

| Ingredient | Weight Percent |
| --- | --- |
| epoxy resin | 16.09 |
| propylene glycol methyl ether acetate | 24.54 |
| methyl ethyl ketoxime-blocked polyisocyanate | 24.52 |
| water | 21.06 |
| solvent naphtha | 8.17 |
| xylene | 5.25 |
| fluoropolymer surfactant | 0.11 |
| aminopropyl trimethoxy silane | 0.25 |
| dibutyltin dilaurate | 30 ppm |

Example 15

| Ingredient | Weight Percent |
| --- | --- |
| epoxy resin | 16.03 |
| propylene glycol methyl ether acetate | 46.53 |
| caprolactam-blocked polyisocyanate | 24.43 |
| xylene | 12.64 |
| fluoropolymer surfactant | 0.11 |
| aminopropyl trimethoxy silane | 0.25 |
| dibutyltin dilaurate | 30 ppm |

While the adhesion-promoter component is listed as one of the ingredients of the composition in all formulations given above, one skilled in the art would recognize that it would not be mixed with the other ingredients until just prior to application of the formulation to the ceramic or other substrate. The nature of all components is such that the preparation of the composition does not require any particular procedure. All ingredients, with the exception of the adhesion promoter, may be mixed according to standard laboratory and commercial techniques that are well known to those skilled in the art. The resulting coating compositions are stable at room temperature, inasmuch as the blocked isocyanates become deblocked at approximately 300° F. (149° C.).

In use, the coating formulations of this invention are applied to a rigid substrate, such as the surface of a mug, that is to be imprinted with an image by sublimation or diffusion transfer. The coating may be applied in any of the ways available for application of thin layers of material to a supporting substrate, most commonly by spraying or dipping in a liquid bath. As mentioned above, different formulations with different viscosities would be used to best suit different methods of application.

An adhesion promoter, if used, is either mixed with the composition or it is instead first applied by itself to the substrate immediately prior to application of the coating. A thin layer of coating is then applied and cured at approximately 400° F. (204° C.) for about 15 minutes to cause the partial polymerization of the mixture to obtain a polyurethane coating. This polymer will contain unreacted isocyanate groups that are instrumental to the functioning of the invention after the image transfer has taken place. After cooling, the coating is stable at normal ambient conditions because a temperature of approximately 110° F. (43° C.) in 100% relative humidity is required for the isocyanates to start reacting. Thus, the problem of unrefrigerated transportation and storage during the summer is overcome.

After application and curing of the coating, the coated articles are ready for imprinting according to the standard procedures used for sublimation and diffusion transfer. When the coating is first exposed to hot water, such as in an automatic dishwasher, the isocyanate groups react with water, liberating $CO_2$ and freeing amine groups that form highly cross-linked polyisocyanurates as a film along the surface of the coating. This polymer skin provides protection of the image fixed in the coating and prevents the loss of adhesion that is normally characteristic of polyurethane coatings. I found that no appreciable image distortion or coating damage is visible after 100 dishwasher cycles.

Thus, while the invention has been particularly shown and described with reference to a preferred embodiment thereof, it will be understood by those skilled in the art that changes in form and detail may be made therein without departing from the spirit and the scope of the invention.

I claim:

1. A polyurethane coating composition for application over the surface of a substrate to be imprinted with an image by means of sublimation transfer, comprising:
   (a) an epoxy component in the range from 4 to 30 percent by weight of the total composition and having a formula corresponding to:

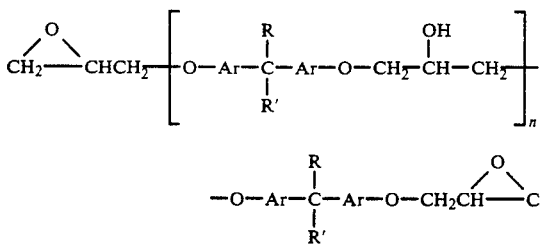

Ar is any aryl group; n may vary between 2 and 18; and R and R' consist of a hydrocarbyl radical with 1-6 carbon atoms, or of mixtures thereof; and (b) a polyisocyanate component in the range from 3 to 36 percent by weight of the total composition, wherein the isocyanate groups comprise at least two functional groups and are blocked with a blocking group capable of being deblocked upon heating at about 250° to about 430° F.;

wherein the epoxy and isocyanate components are combined to form a highly crosslinked polyurethane polymer.

2. The polyurethane coating composition of claim 1, wherein the epoxy component is present in the range from 10 to 25 percent by weight of the total composition.

3. The polyurethane coating composition of claim 1, wherein n may vary between 8 to 14 in the formula for the epoxy component.

4. The polyurethane coating composition of claim 1, wherein the polyisocyanate component is present in the range from 6 to 30 percent by weight of the total composition.

5. The polyurethane coating composition of claim 1, wherein the polyisocyanate groups are blocked with an oxime group.

6. The polyurethane coating composition of claim 1, wherein the polyisocyanate groups are blocked with methyl ethyl ketoxime.

7. The polyurethane coating composition of claim 1, wherein the polyisocyanate groups are blocked with caprolactam.

8. The polyurethane coating composition of claim 1, wherein the isocyanate groups have an aliphatic backbone.

9. The polyurethane coating composition of claim 1, wherein the isocyanate groups have a cycloaliphatic backbone.

10. The polyurethane coating composition of claim 1, wherein the epoxy and isocyanate components are combined in an equivalent-weight ratio in the range from 0.6 to 1.2.

11. The polyurethane coating composition of claim 1, wherein the epoxy component is diluted with an ingredient selected from the group consisting of polyesters, polyethers, polyacrylic polyols, and mixtures thereof.

12. The polyurethane coating composition of claim 1, wherein the polyisocyanate component is diluted by substituting 10 to 20 percent of polyisocyanate equivalents with equivalents of melamine resin.

13. The polyurethane coating composition of claim 1, further comprising a solvent carrier consisting of a mixture of glycolether esters and aromatic hydrocabrons.

14. The polyurethane coating composition of claim 1, wherein the solvent carrier consists of an aromatic hydrocarbon in combination with an ingredient selected from the group consisting of polypropylene glycol methyl ether acetate, ethyl 3ethoxypropionate, or a mixture thereof.

15. The polyurethane coating composition of claim 13, wherein the solvent carrier is diluted with an ingredient selected from the group consisting of lower boiling esters, aromatic hydrocarbon solvents, n-butanol, isopropanol, water, or mixtures thereof.

16. The polyurethane coating composition of claim 1, further comprising a urethane polymerization catalyst.

17. The polyurethane coating composition of claim 16 wherein said urethane polymerization catalyst is selected from the group consisting of tertiary amines, amine-blocked Lewis acids, p-toluenesulfonic acid,/ tris(dimethylaminomethyl) phenol, dibutyltin dilaurate, and stannous octoate.

18. The polyurethane coating composition of claim 1, further comprising a flow modifier.

19. The polyurethane coating composition of claim 18, wherein said flow modifier is selected from the group consisting of silanol-dimethyldiphenylsiloxane, fluoropolymer surfactants, or mixtures thereof in concentrations of 0.2 to 1.0 parts per hundred parts by weight of polyurethane resin.

20. The polyurethane coating composition of claim 1, further comprising a component capable of screening or absorbing ultraviolet radiation.

21. The polyurethane coating composition of claim 20, wherein said component capable of screening or absorbing ultraviolet radiation is selected from the group consisting of hindered-amine light stabilizers, hindered phenols, benzotriazoles, cyanoacrylate esters, or mixtures thereof.

22. The polyurethane coating composition of claim 1, further comprising an adhesion promoter added to the composition immediately prior to its use for coating a substrate surface.

23. The polyurethane coating composition of claim 22, wherein said adhesion promoter is selected from the group consisting of aminopropyltrimethoxysilane, aminopropyltriethoxysilane, aminoethylaminopropyltrimethoxysilane, aminoethylaminopropylethoxysilane, or mixtures thereof in concentrations of 0.2 to 2.0 parts per hundred parts by weight of polyurethane resin.

24. A highly crosslinked polyurethane coating composition applied over the surface of a substrate to be imprinted with an image by means of sublimation transfer, comprising the following ingredients in the specified concentrations expressed as weight percentages of total composition:

| Ingredient | Weight Percent |
| --- | --- |
| epoxy resin | 18.33 |
| ethyl 3-ethoxy propionate | 43.75 |
| melamine resin | 3.23 |
| polyarylate polyol | 5.80 |
| methyl ethyl ketoxime-blocked polyisocyanate | 7.76 |
| fluoropolymer surfacant | 0.11 |
| n-butanol | 1.94 |
| n-butyl acetate | 7.96 |
| propylene glycol methyl ether acetate | 5.58 |
| solvent naphtha | 2.54 |
| xylene | 0.80 |
| p-toluenesulfonic acid | 0.65 |
| isopropanol | 0.43 |
| amin[i]opropyltrimethoxysilane | 1.08 |

25. A highly crosslinked polyurethane coating composition applied over the surface of a substrate to be imprinted with an image by means of sublimation transfer, comprising the following ingredients in the specified concentrations expressed as weight percentages of total composition:

| Ingredient | Weight Percent |
| --- | --- |
| epoxy resin | 17.42 |
| propylene glycol methyl ether acetate | 40.91 |
| methyl ethyl ketoxime-blocked polyisocyanate | 23.00 |
| solvent naphtha | 7.67 |
| xylene | 10.79 |
| fluoropolymer surfactant | 0.04 |
| aminopropyl trimethoxy silane | 0.17 |
| dibutyltin dilaurate | 34 ppm |

26. A method of coating the surface of a substrate to be imprinted with an image by means of sublimation transfer, comprising the following steps:
   (a) providing a polyurethane composition comprising a mixture of an epoxy component and a polyisocyanate component, the epoxy component being in the range from 4 to 30 percent by weight of total composition and having the formula corresponding to:

wherein Ar is an aryl group; n may vary between 2 and 18; and R and R' consist of a hydrocarbyl radical with 1-6 carbon atoms; or of mixtures thereof; and the polyisocyanate component being in the range from 3 to 36 percent by weight of total composition, wherein the isocyanate groups comprise at least two functional groups and are blocked with a blocking group capable of being deblocked upon heating at about 250° to about 430° F.;
   (b) adding an adhesion promoter to the polyurethane composition;
   (c) coating the surface of the substrate with the polyurethane composition; and
   (d) curing the coating at approximately 400° F. for about 15 minutes to cause a highly crosslinked partial polymerization of the mixture.

* * * * *